United States Patent [19]
El-Ibiary et al.

[11] Patent Number: 5,746,452
[45] Date of Patent: May 5, 1998

[54] BEARING ASSEMBLY HAVING INTEGRATED SPEED SENSOR

[75] Inventors: Yehia El-Ibiary, Simpsonville; Donald L. Nisley, Greenville; Jack D. Stroobandt, Simpsonville, all of S.C.

[73] Assignee: Reliance Electric Industrial Company, Cleveland, Ohio

[21] Appl. No.: 412,521

[22] Filed: Mar. 29, 1995

[51] Int. Cl.$^6$ .................................................. F16C 19/00
[52] U.S. Cl. ........................................ 384/446; 384/448
[58] Field of Search ................................... 384/448, 446, 384/571, 584, 538

[56] References Cited

U.S. PATENT DOCUMENTS

| | | |
|---|---|---|
| 4,069,435 | 1/1978 | Wannerskog et al. |
| 4,797,549 | 1/1989 | Ho et al. |
| 4,978,234 | 12/1990 | Ouchi. |
| 5,332,964 | 7/1994 | Ouchi .................. 384/448 |
| 5,451,869 | 9/1995 | Alff ..................... 384/448 |
| 5,468,072 | 11/1995 | Ekdahl et al. ............ 384/448 |

FOREIGN PATENT DOCUMENTS

0617206A2  9/1994  European Pat. Off.

OTHER PUBLICATIONS

Advertisement for Electro-Sensors Digital Tachometer Models AP 1000, AP 1000BCD an AP 1003, dated 1993.

*Primary Examiner*—Lenard A. Footland
*Attorney, Agent, or Firm*—Craig N. Killen; John M. Miller; John J. Horn

[57] ABSTRACT

An improved bearing apparatus including a housing having a bearing assembly contained therein. A sensor device is mounted to the housing for detecting the rotational rate of the shaft. The sensor device may be configured as a magnetic-type sensor operative to sense variations in magnetic characteristics produced during rotation of an annular detection element. Alternatively, the sensor device may be an optical sensor for detecting variations in optical characteristics produced by shaft rotation. In some presently preferred embodiments, the detection element is a nut or collar also utilized to effect securement of the bearing assembly to the shaft. Preferably, the shaft terminates at an interior location of the housing. In this case, the housing may include an end wall or cap for covering an end of the shaft.

24 Claims, 5 Drawing Sheets

BEARING ASSEMBLY HAVING INTEGRATED SPEED SENSOR

BACKGROUND OF THE INVENTION

The present invention relates generally to the art of bearing assemblies for facilitating rotation of a shaft. More particularly, the invention relates to a bearing assembly having an integrated speed sensor for detecting a rotational rate of the shaft.

Bearing assemblies are often constructed including their own housing, such as a pillow block or a flange housing. The housing facilitates placement of the bearing at a desired location for supporting a rotatable shaft. Generally, suitable means are provided for effecting operative securement of the bearing assembly to the shaft. A variety of securement means may be utilized for this purpose, including set screws, eccentric collar, clamping collar and tapered adapter sleeve configurations.

In one typical application, such self-contained bearings may be used to rotatably support pulleys in a conveyor system. At least one such pulley will generally be driven by a prime mover, such as an electric motor. Other pulleys are undriven, thereby functioning simply as idlers to guide and support the conveyor belt.

In some situations, slippage may occur between the conveyor belt and one or more of the pulleys. Occurrence of such slippage, particularly at the drive pulley, can result in significant wear being imparted to the conveyor belt. Worn belts must be replaced, leading to replacement cost and loss of productivity during maintenance. In other situations, belts may tear, which can cause undesirable accumulation of product fed by a preceeding conveyor.

Belt slippage or a torn belt may both be evidenced by a reduction in speed of an undriven pulley rotated by the belt. One technique for detecting this speed change utilizes a disk attached to an end of the pulley shaft. The disk is configured having multiple slots or multiple magnets spaced apart about its circumference. In addition, a speed sensor is mounted to a bracket such that it will be proximate to the rotating disk. An output signal of the speed sensor is indicative of the rate at which the shaft, and thus the pulley, is rotating.

While this prior art arrangement is generally effective for sensing shaft rotation, it has a number of significant disadvantages. For example, the exposed disk and sensor are particularly susceptible to damage during use. The fast-paced industrial environments in which conveyors are generally utilized only contribute to the potential for damage.

Additionally, the location of the disk requires that the shaft extend beyond the bearing housing. Accordingly, it has not been possible in this situation to utilize a bearing housing in which one side thereof is closed to decrease leakage and contamination.

SUMMARY OF THE INVENTION

The present invention recognizes and addresses the foregoing disadvantages, and others, of prior art constructions and methods. Accordingly, it is an object of the present invention to provide an improved bearing assembly.

It is another object of the present invention to provide an improved sensing arrangement for determining the rotational speed of a shaft.

It is a more particular object of the present invention to provide a sensing arrangement for determining the rotational speed of a shaft which is less susceptible to damage than prior art arrangements.

It is also an object of the present invention to provide an improved method of detecting the rotational rate of a shaft supported by at least one bearing assembly.

Some of these objects are achieved by an improved bearing apparatus including a bearing housing having a bearing assembly contained therein. The bearing assembly includes respective first and second ring members capable of relative rotation, with the first ring member being secured to the shaft during operation. A sensor device is mounted to the housing for detecting the rotational rate of the shaft.

In presently preferred embodiments, the bearing assembly further includes a detection element affixed during operation with respect to the first ring member. In such embodiments, the sensor device is preferably operative to detect a rate of rotation of the shaft by detecting a rate of rotation of the detection element. The sensor may be configured as an inductive sensor operative to sense variations in its inductance produced during rotation of the detection element. Other sensors may also be used in some embodiments, however, such as magnetic pick-up sensors or optical sensors.

In some presently preferred embodiments, the bearing assembly may be secured to the shaft utilizing a clamping arrangement having a nut or a clamping collar. In such embodiments, the nut or collar may be adapted to facilitate detection of the rotational rate of the shaft. As a result, an element already utilized in the bearing assembly for securement may also effectively function as the detection element.

In such embodiments, the nut or collar may be constructed in a number of configurations. For example, the nut or collar may be configured defining a plurality of slots spaced apart about its circumference. Alternatively, a plurality of holes may be defined at spaced apart locations about the circumference of the nut or collar, with or without respective plug members located therein. In another exemplary configuration, the sensor device may read off an attached sprocket element.

In presently preferred embodiments, the sensor device extends through a wall of the housing. A portion of the sensor on the outside of the housing may be protected by a shroud element. The sensor device itself may be situated in various sensing directions, such as axially or radially disposed with respect to the detection element.

Preferably, the shaft terminates at an interior location of the housing. In this case, the housing may include a covered end portion for shielding an end of the shaft. The end portion may be removable or may be formed integral with the bearing housing.

Other objects of the invention are achieved by a method of detecting a rate of rotation of a shaft supported by at least one bearing assembly. The method comprises the step of providing the bearing assembly with an annular detection element affixed with respect to an inner ring member of the bearing. As an additional step, a sensor device is provided which is capable of detecting a rate of rotation of the annular detection element. Another step involves situating the sensor device in a fixed location proximate to the bearing such that a sensing direction thereof is oriented toward the annular detection element. A regular variation in a predetermined characteristic caused by rotation of the annular detection element is then detected with the sensor device. As a further step, the rate of rotation of the shaft is determined from the regular variation in the predetermined characteristic.

The sensor device utilized in the method may be an inductive sensor. In this case, the regular variation in the predetermined characteristic would be a regular variation in an inductance of the sensor produced by rotation of the annular detection element. Other sensors, such as magnetic pick-up sensors and optical sensors, may also be utilized.

Other objects, features and aspects of the present invention are provided by various combinations and subcombinations of the disclosed elements, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
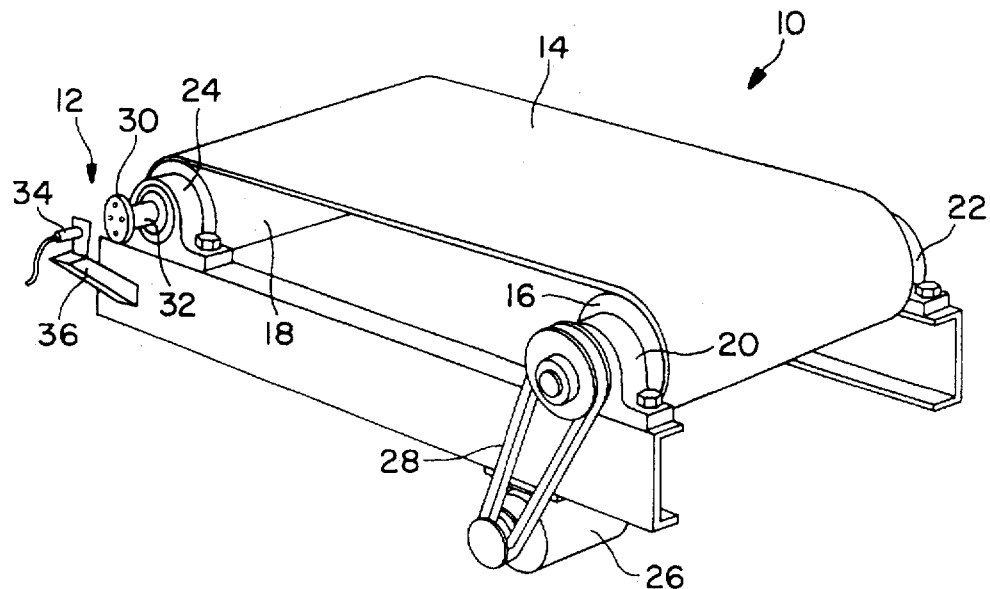
FIG. 1 is a perspective view of a conveyor apparatus including a speed detection arrangement of the prior art.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting broader aspects of the present invention, which broader aspects are embodied in the exemplary constructions.

FIG. 1 illustrates a conveyor system 10 utilizing a prior art arrangement 12 for determining shaft speed. As shown, conveyor 10 includes an endless conveyor belt 14 extending about a pair of pulleys respectively indicated at 16 and 18. Shaft portions extending from each axial end of pulley 16 are supported by bearing assemblies 20 and 22. Similarly, pulley 18 is supported by a bearing assembly 24 and a similar bearing assembly at its opposite axial end (not shown). Pulley 16 is driven by an electric motor 26 via a drive belt 28.

Arrangement 12 includes a disk 30 mounted to an end of shaft 32, which is a continuation of the shaft supported by bearing assembly 24. As described above, disk 30 is configured having multiple slots or multiple magnets spaced apart about its circumference. A sensor 34, such as an inductive sensor, is mounted in a sensing direction toward and proximate to disk 30. As shown, sensor 34 is maintained in this position by a mounting bracket 36.

It can be seen that the relatively large components of arrangement 12 are exposed during use. As a result of this exposed condition, disk 30 and sensor 34 are often subject to damage. Thus, speed measurement arrangements of this type have been prone to failure.

The presence of shaft 32 also requires bearing assembly 24 to have a housing which is open throughout. As a result, a housing which is closed on one side cannot be used. Closed housings are desirable in many situations, however, to enclose the rotating end of the pulley shaft such that leakage and contamination are reduced.

Figure 2:
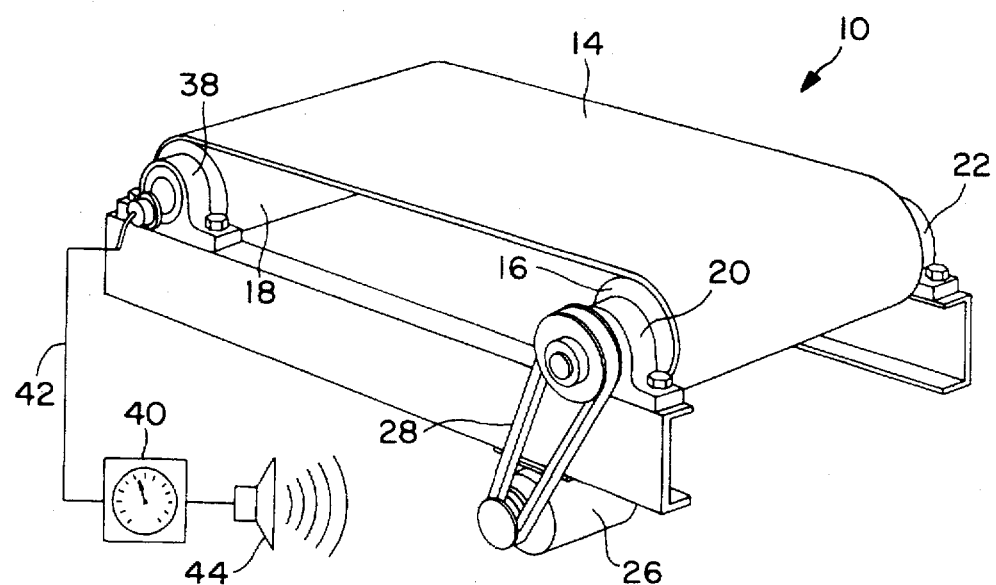
FIG. 2 is a view similar to FIG. 1 but including a bearing assembly having an integrated speed sensor as constructed in accordance with the present invention.

FIG. 2 illustrates a modification of conveyor system 10 which overcomes the noted disadvantages of the prior art. In this case, it can be seen that the various elements of speed measurement arrangement 12 have been eliminated. Instead, bearing assembly 24 has been replaced with a bearing assembly 38 constructed in accordance with the present invention. Other conventional aspects of conveyor system 10 remain unchanged and are indicated by the same reference number.

As will be explained more fully below, bearing assembly 38 integrally includes means for determining the rotational rate of the pulley shaft. An appropriate indicator device 40, such as has been utilized with the prior art, may be provided to give an indication of the rotational rate of such shaft. Typically, indicator device 40 will be electrically connected to bearing assembly 38 utilizing an appropriate conductor, such as line 42.

A visual indicator or an audible device, such as speaker 44, may also be included to provide a warning when certain events take place. For example, indicator device 40 is preferably configured to provide a warning if the rotational rate of the monitored pulley falls below the drive speed by more than a predetermined threshold. For example, speaker 44 may sound an alarm if the speed of pulley 18 is more than six (6) percent or other suitable threshold below the speed of pulley 16.

Figure 3:
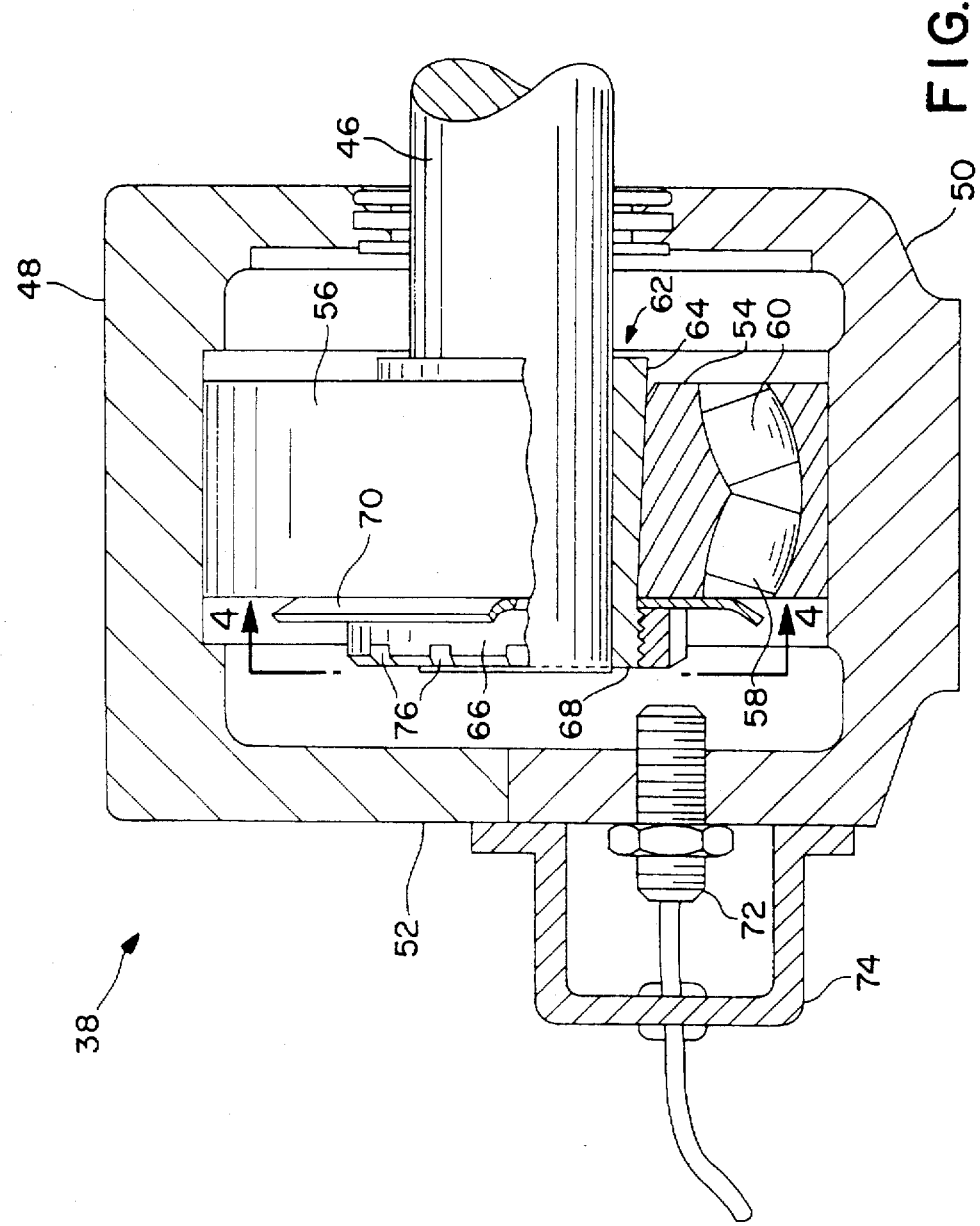
FIG. 3 is a partial cross-sectional view of a bearing assembly of the present invention utilizing a tapered adapter clamping arrangement.

Referring now to FIG. 3, the construction of an exemplary embodiment of bearing assembly 38 will be described in detail. As shown, bearing assembly 38 is operatively connected to a rotatable shaft 46 which terminates inside of a bearing housing. The bearing housing in this case includes a top portion, or cap 48, situated on a base 50. As a result of this construction, it can be seen that an end wall 52 is formed in the housing such that the rotating end of shaft 46 will be unexposed.

Internal to housing 48, bearing assembly 38 includes a bearing inner ring member 54 secured to shaft 46 in a suitable manner. Inner ring member 54 defines an inner raceway about its outer circumferential surface, as shown. An outer ring member 56 is further provided having an outer raceway situated in opposition to the inner raceway. A plurality of bearing elements, such as roller bearings 58 and 60, are disposed between the inner raceway and the outer raceway to facilitate relative rotation between ring members 54 and 56. While roller bearings are illustrated, it should be appreciated that other suitable types of bearing elements, such as ball bearings, may also be utilized for this purpose.

Depending on the exigencies of a particular application, various techniques may be utilized to effect securement of inner ring member 54 to shaft 46. In the exemplary embodiment illustrated in FIG. 3, such securement is effected utilizing a tapered adapter 62. As shown, tapered adapter 62 includes a tapered portion 64 having a first end of a lesser diameter extending to a second end of a greater diameter. Portion 64 thus defines a tapered outer surface between the first end and the second end thereof. Tapered adapter 62 further defines a radial opening, or slot, extending along its entire axial length.

In this case, inner ring member 54 defines a tapered inner surface generally complementary to the tapered outer surface of portion 64. The radial opening of adapter 62 allows it to contract about shaft 46 when the tapered outer surface of portion 64 and the tapered inner surface of inner ring member 54 are moved axially together. As a result, inner ring member 54 is positively clamped to shaft 46.

The relative axial movement between adapter 62 and inner ring member 54 may be accomplished utilizing a nut 66 engaging a threaded portion 68 of tapered adapter 62. In the exemplary embodiment illustrated, portion 68 is located adjacent the lesser diameter end of tapered portion 64. A washer 70 may be interposed between nut 66 and inner ring member 64, as shown.

As described above, bearing assembly 38 includes a sensor device 72 for detecting the rotational rate of shaft 46. It will be appreciated that various types of sensors may be utilized in accordance with the present invention. The exemplary construction illustrated utilizes a "magnetic-type" sensor, which refers herein to a sensor which detects speed based on variations in a magnetic phenomenon, such as an inductive sensor or a magnetic pick-up sensor.

An inductive sensor typically functions by detecting changes in the inductance of a sensor coil caused by variations in adjacent metallic bodies. A suitable inductive sensor for this purpose is Model No. 871T, manufactured by Allen-Bradley. A magnetic pick-up sensor typically functions to generate an EMF in response to a time-varying magnetic field.

As can be seen, sensor device 72 is threaded into a bore formed in end wall 52. It will be appreciated that the compact configuration of sensor device 72 and its placement make it much less susceptible to damage than the prior art configuration shown in FIG. 1. However, a shroud element 74 may be attached to housing 48 and situated about sensor device 72 to provide additional protection from damage.

Because inner ring member 54 is secured to shaft 46, sensor device 72 may determine the rotational rate of shaft 46 by determining the rotational rate of inner ring member 54. In this case, sensor device 72 is oriented to detect variations in its inductance caused by rotation of nut 66, which rotates with inner ring member 54. A particular advantage of this embodiment, as well as many others of the present invention, is the use of an element already present in bearing assembly 38 for an additional purpose.

Figure 4:
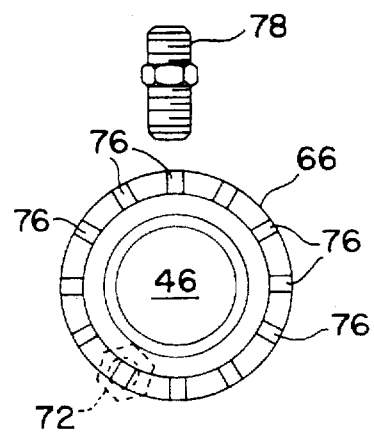
FIG. 4 is a view as taken along lines 4—4 of FIG. 3.

As can be most easily seen in FIG. 4, nut 66 has been modified to facilitate speed detection. Specifically, nut 66 defines a series of slots 76 spaced about its outer circumferential surface. As will be appreciated, slots 76 define regions having a different magnetic permeability than adjacent regions of nut 66. Thus, as nut 66 rotates, this varying permeability may be detected at sensor device 72. The frequency of these variations is indicative of rotational speed.

In FIG. 3, sensor device 72 is shown oriented in a sensing direction substantially parallel to the axis of shaft 46. It should be appreciated, however, that sensor device 72 may be situated in various other orientations which may be preferred in some applications. For example, FIG. 4 illustrates a sensor device 78 which is oriented radially with respect to shaft 46.

Figure 4A:
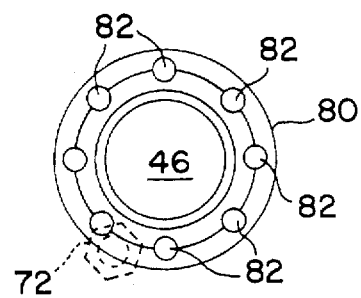
FIGS. 4A–4C are views similar to FIG. 4 illustrating various alternative configurations of the annular detection element.
Figure 4B:
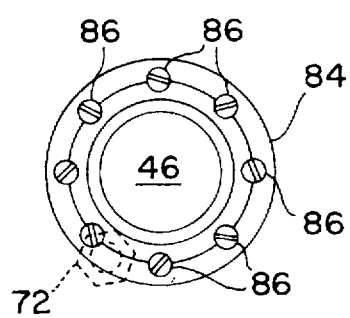
Figure 4C:
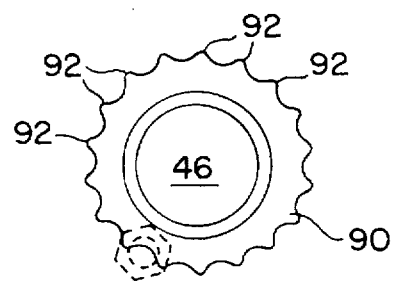

FIGS. 4A through 4C illustrate other nut embodiments which may also be utilized to produce predetermined magnetic variations. For example, FIG. 4A illustrates an alternative nut 80 having a series of holes 82 defined about its circumference. Such holes function to produce magnetic variations in a manner similar to slots 76 of nut 66.

In FIG. 4B, a nut 84 is provided having a plurality of plug elements 86 attached thereto at spaced apart locations about its circumference. Such plug elements may be configured of a material having to have either greater or lesser magnetic permeability than adjacent portions of nut 84. In other cases, plug elements 86 may be constructed of a material very similar to nut 84. In such embodiments, plug elements 86 should be either protrude from or be sunken into nut 84 to present a varying metal thickness to the sensor device. Elements 86 may be threaded elements, such as screws, engaging threaded holes defined in nut 84.

FIG. 4C illustrates a nut having a sprocket element 90 fixedly attached thereto. As shown, sprocket element 90 defines a number of protruding teeth 92 separated by adjacent concave regions. This construction also produces predetermined magnetic variations as the nut is rotated.

The above discussion has noted various modifications that may be made to the nut to facilitate speed detection. While a multiplicity of features, (i.e., slots 76, holes 82, plug elements 86 or teeth 92), for producing the magnetic variations have been shown, it should be appreciated that in many cases relatively few may be required. For example, one presently preferred embodiment utilizes two plug elements spaced apart by 180°. It should also be appreciated that similar modifications may also be made to inner ring member 54 or tapered adapter 64. For example, slots similar to slots 76 may be defined in the larger diameter end of tapered portion 64.

Figure 5:
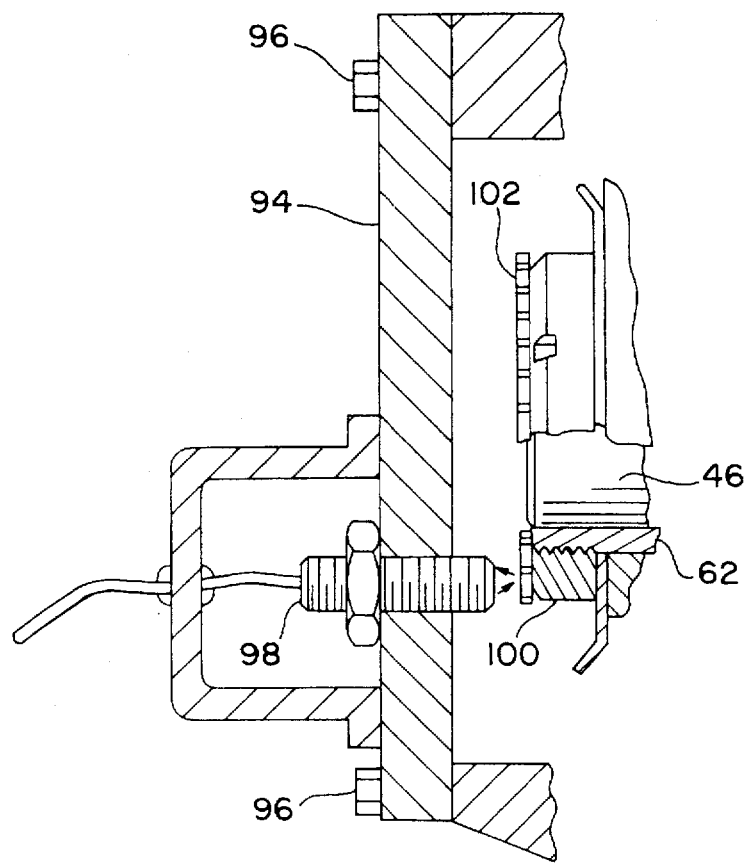
FIG. 5 is an enlarged partial cross-sectional view illustrating the use of an optical sensor.

Referring now to FIG. 5, certain alternative features of a bearing assembly constructed in accordance with the invention are illustrated. Instead of a cap and base arrangement as shwon in FIG. 3, the bearing housing in this case includes a removable end cap 94 attached by bolts 96 or other suitable means of effecting such attachment. A removable end cap such as end cap 94 will often be desirable to facilitate maintenance of the interior components of the bearing assembly.

FIG. 5 further illustrates the use of an optical sensor device 98 instead of a magnetic-type sensor as described above. In this configuration, a nut 100 is provided having a slotted disc 102 attached thereto. Sensor device 98 includes a light source which directs incident light upon slotted disc 102, as shown by the arrow. The slots in disc 102 cause varying degrees of reflection back toward sensor device 98 during shaft rotation. Such reflection is sensed by a photodetector within sensor device 98. The frequency of the variations in reflection is thus indicative of shaft speed.

Figure 6:
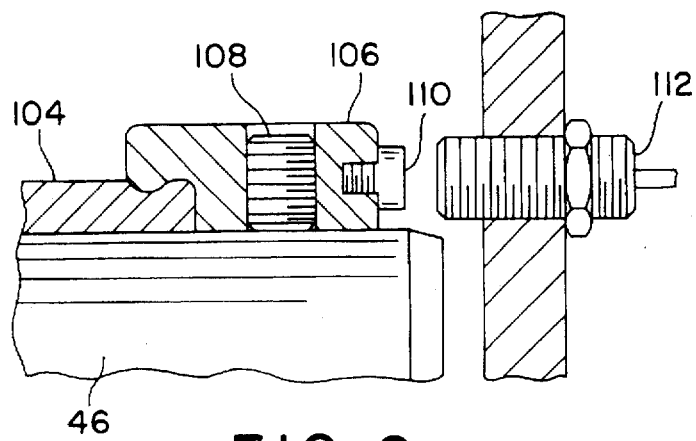
FIG. 6 is an enlarged partial cross-sectional view illustrating an embodiment of the present invention utilizing an eccentric collar clamping arrangement.

Additionally, embodiments of the present invention may be constructed wherein means other than a tapered adapter are utilized to clamp the inner ring member to a shaft. For example, embodiments may be constructed utilizing eccentric collar or set screw clamping arrangements. In this regard, FIG. 6 illustrates an embodiment utilizing an eccentric collar clamping arrangement.

As shown, the inner ring member in this arrangement includes an extension portion 104 defining an outer circumferential groove near its axial end. This groove will preferably be slightly eccentric with respect to the shaft bore of the inner ring member. A clamping collar 106 is provided having a portion adapted for mating with the outer circumferential groove of portion 104. This mating portion will also be slightly eccentric. Rotation of collar 106 with respect to portion 104 thus causes a clamping of the bearing assembly to shaft 46. A set screw 108 may be provided to secure the clamping positions of collar 106 and portion 104. The operation of such an eccentric collar configuration is well known to those of ordinary skill in the art.

It will be appreciated that collar 106 may be modified in a manner similar to nut 66 of FIG. 3. In the illustrated embodiment, for example, collar 106 includes a plurality of plug elements such as plug element 110, spaced apart its circumference. Rotation of shaft 46 thus presents a variation in magnetic characteristics which may be detected by sensor 112 in the manner described above.

Figure 7:
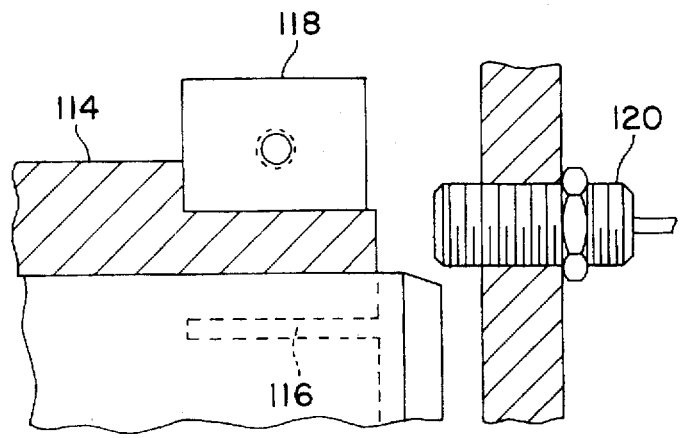
FIG. 7 is an enlarged partial cross-sectional view illustrating a still further embodiment of the present invention utilizing a clamping finger clamping arrangement.

As shown in FIG. 7, other embodiments may be constructed utilizing a clamping arrangement in which the inner ring member includes an extension portion defining 114 a plurality of axial slots 116 spaced apart about its circumference to form a plurality of clamping fingers. A clamping collar 118 is disposed about the clamping fingers and tightened to force the clamping fingers into engagement with the shaft.

In this case, sensor device 120 may be oriented to "read" from the slots 116 defined in portion 114. As a result, it may not be necessary with this arrangement to modify clamping collar. Alternatively, clamping collar 118 may be modified as described above.

While preferred embodiments of the invention have been shown and described, it will be appreciated that modifications and variations may be made thereto by those of ordinary skill in the art without departing from the spirit and scope of the present invention. As mentioned above, for example, any suitable sensing device may be utilized which is capable of detecting rotational rate. For example, although not specifically discussed above, it is contemplated that ultrasonic sensors may also be utilized in some applications. In addition, the clamping arrangements described above are exemplary of various clamping arrangements with which aspects of the present invention may be applicable. Thus, the appended claims are intended to include such other clamping arrangements, where appropriate.

It will be further appreciated that aspects of the various embodiments may be interchanged both in whole or in part. Additionally, those of ordinary skill in the art will appreciate that the foregoing description is by way of example only, and is not intended to be limitative of the invention so further described in the appended claims.

What is claimed is:

1. A bearing apparatus comprising:
    a bearing housing;
    a bearing assembly contained in said housing and including respective first and second ring members capable of relative rotation; securement means for securing said first ring member to a rotatable shaft during operation such that said first ring member will rotate therewith;
    detection means, associated with said securement means, for producing predetermined variations in a predetermined characteristic as said securement means is rotated; and
    a sensor device mounted to said housing and operative to detect a rate of rotation of said shaft by detecting said detection means.

2. A bearing apparatus as set forth in claim 1, wherein said sensor device extends through a wall of said housing.

3. A bearing apparatus as set forth in claim 2, wherein said sensor device is situated in a sensing direction axially disposed with respect to said shaft.

4. A bearing apparatus as set forth in claim 2, wherein said sensor device is situated in a sensing direction radially disposed with respect to said shaft.

5. A bearing apparatus as set forth in claim 2, further comprising a shroud element attached to said housing and positioned to protect said sensor device.

6. (Amended) A bearing apparatus as set forth in claim 1, wherein said sensor device is an optical sensor.

7. (Amended) A bearing apparatus as set forth in claim 1, wherein said detection means is an annular element separable from said first ring member.

8. (Amended) A bearing apparatus, comprising:
    a bearing housing;
    a bearing assembly contained in said housing and including respective first and second ring members capable of relative rotation, said first ring member secured to a rotatable shaft during rotation to rotate therewith;
    a detection element rotatable with said first ring member, wherein said detection element is an annular nut separable from said first ring member and utilized to secure said first ring member to said shaft; and
    a sensor device mounted to said housing and operative to detect a rate of rotation of said shaft by detecting a rate of rotation of said detection element and thus said first ring member.

9. (Amended) A bearing apparatus as set forth in claim 1, wherein said detection means is a clamping collar utilized to secure said first ring member to said shaft.

10. (Amended) A bearing apparatus as set forth in claim 1, wherein said detection means comprises an integral extension portion of said first ring member having a plurality of axial slots formed therein to form clamping fingers.

11. (Amended) A bearing apparatus as set forth in claim 1, wherein said detection means is configured defining a plurality of slots spaced apart about a circumference thereof to produce the predetermined variations in said predetermined characteristics.

12. (Amended) A bearing apparatus as set forth in claim 1, wherein said detection means is configured defining a plurality of holes spaced apart about a circumference thereof to produce the predetermined variation in said predetermined characteristics.

13. (Amended) A bearing apparatus as set forth in claim 1, wherein said detection means includes a plurality of plug members situated at spaced apart locations about a circumference thereof to produce the predetermined variations in the predetermined characteristics.

14. (Amended) A bearing apparatus as set forth in claim 13, wherein said plug members are threaded members.

15. (Amended) A bearing apparatus as set forth in claim 1, wherein said detection means includes a sprocket element attached thereto to produce the predetermined variation in said predetermined characteristics.

16. A bearing apparatus as set forth in claim 1, wherein said sensor device is a magnetic-type sensor operative to sense said predetermined variations in magnetic characteristics produced during rotation of said detection means.

17. (Amended) A bearing apparatus as set forth in claim 16, wherein said magnetic-type sensor is an inductive sensor.

18. (Amended) A bearing apparatus as set forth in claim 16, wherein said magnetic-type sensor is a magnetic pick-up sensor.

19. A bearing apparatus as set forth in claim 1, further comprising an indicator device in electrical communication with said sensor device for providing a selected indication of an output of said sensor device.

20. A bearing apparatus as set forth in claim 1, wherein said shaft terminates at an interior location in said housing.

21. (Amended) A bearing apparatus comprising:
    a bearing housing having a shaft terminating at an interior location thereof, said housing including an end wall for covering an end of said shaft;

a bearing assembly contained in said housing and including respective first and second ring members capable of relative rotation, said first ring member secured to said shaft during operation to rotate therewith; and a sensor device mounted to said housing and operative to detect a rate of rotation of said shaft by detecting a rate of rotation of said first ring member.

22. (Amended) A bearing apparatus comprising:

a bearing housing;

a bearing assembly contained in said housing and including respective first and second ring members capable of relative rotation, said first ring member secured to a shaft during operation to rotate therewith:

a sensor device mounted to said housing and operative to detect a rate of rotation of said shaft by detecting a rate of rotation of said first ring member; and wherein said bearing assembly is secured to said shaft utilizing a tapered adapter having a nut threaded thereon, said nut being adapted to facilitate detection the rate of rotation of said shaft.

23. A bearing assembly for facilitating rotation of a shaft, said bearing assembly comprising:

a tapered adapter for receipt about the shaft, said tapered adapter including a tapered portion and a threaded portion;

a bearing inner ring member defining a tapered inner surface for receipt about said tapered portion of said tapered adapter;

a bearing outer ring member situated radially outward of said bearing inner ring member;

a plurality of bearing elements disposed between said bearing inner ring member and said bearing outer ring member;

a nut engaging said threaded portion of said tapered adapter for effecting clamping of said bearing assembly to said shaft, said nut being adapted to facilitate detection of the rate of rotation of said shaft; and a sensor device operative to sense rotation of said nut and thereby detect a rate of rotation of said shaft.

24. A bearing assembly as set forth in claim 23, wherein said sensor device is a magnetic-type sensor operative to sense predetermined variations in magnetic characteristics produced during rotation of said nut.

* * * * *